Patented Dec. 9, 1941

2,265,163

UNITED STATES PATENT OFFICE 2,265,163

A MIXTURE OF SULPHONIC ACID CHLORIDES

Paul Herold, Karl Smeykal, Wilhelm Wolf, and Friedrich Asinger, Leuna, Germany, assignors, by mesne assignments, to General Aniline & Film Corporation, New York, N. Y., a corporation of Delaware No Drawing. Application June 1, 1939, Serial No. 276,804. In Germany July 23, 1938

1 Claim. (Cl. 260—543)

The present invention relates to a mixture of sulphonic acid chlorides.

We have found the chlorinated sulphonic acid chlorides can be obtained by causing mixtures of sulphur dioxide and chlorine to act, during irradiation with short-wave light, in the liquid phase on halogen hydrocarbons containing in the molecule at least one carbon atom to which is attached at least one hydrogen atom but no halogen atom.

As initial materials there may be mentioned for example 1- or 2-monochlorpropane, 1- or 2-monochlor-normal-butane and its isomers, as for example monochlor-isobutanes, 1,2-dichlor-normal-butane, dichlordodecane, monobromoctadecane, and also cyclic halogen hydrocarbons, as for example cyclohexyl chloride.

The halogen hydrocarbons may also contain non-halogenated hydrocarbons. Mixtures of different halogen hydrocarbons may also be used, as for example halogen hydrocarbons which are formed by the action of halogen on the hydrocarbons obtained by the catalytic hydrogenation of carbon monoxide at ordinary or moderately increased pressure, which if desired have been subjected before halogenation to a preliminary purification, as for example by hydrogenation in order to reduce any oxygen-containing or unsaturated by-products.

The halogen hydrocarbons may be subjected to the action of sulphur dioxide and chlorine in dissolved form, if desired also under pressure. The use of solvents is especially advantageous when solid or very low boiling halogen hydrocarbons are used. As solvents there may be used for example halogen hydrocarbons containing one or more halogen atoms on every carbon atom, as for example carbon tetrachloride or ethylene chloride.

The process is carried out for example by leading a mixture of chlorine and sulphur dioxide through dispersing means provided at the bottom of a vessel, for example a vessel consisting of enamelled iron or ceramic material, in which the initial material is situated. The reaction mixture is irradiated with short-wave light at the same time. For example, a mercury vapor lamp may be used or the short-wave light may be allowed to pass into the reaction chamber through a window of quartz or of a glass permeable to ultra-violet light. Rays of light having a shorter wave length than about 2200 Angstrom units sometimes cause a brown coloration of the reaction product and are therefore preferably retained by a suitable filter.

The reaction is advantageously carried out at low temperatures, as for example at 0 to 20° C. It is preferable not to allow the temperature in the reaction vessel to exceed 50° C. since otherwise the formation of more highly chlorinated products free from sulphur predominates.

Equal parts by volume of sulphur dioxide and chlorine may be used. It is often preferable, however, to use an excess of sulphur dioxide, as for example 10 per cent or more, because the entry of chlorine into the hydrocarbon radical is thereby suppressed.

The yield of chlorinated sulphonic acid halides is dependent on the composition of the initial materials. The yields are especially good in the treatment of halogen hydrocarbons in which chlorine is attached to only one or a few carbon atoms. Chlorides of halogenated organic mono- and polysulphonic acids may be formed. In the treatment of short-chain halogen hydrocarbons, as for example monochlorbutane, there often takes place only a single substitution by radicals containing sulphur and chlorine. In the case of long-chain halogen hydrocarbons, the number of radicals containing sulphur and chlorine introduced is dependent to a greater extent on the amount of sulphur dioxide and chlorine led in in all.

The halogen sulphonic acid chlorides formed are high boiling liquids or crystallized bodies. They may be purified by fractional distillation or recrystallization.

The following examples will further illustrate how our said invention may be carried out in practice but the invention is not restricted to these examples. The parts are by weight.

Example 1

Into 1000 parts of chlor-normal-butane there is led during the course of 7 hours a total of 746 parts of chlorine and 746 parts of sulphur dioxide while irradiating with ultra-violet light, the temperature in the reaction chamber being kept at 18° C. The reaction product is fractionally distilled. The unconverted monochlorbutane is distilled off at ordinary pressure and the higher boiling constituents in vacuo.

1100 parts of chlorbutane sulphonic acid chloride having a boiling point of 118° to 120° C. at a pressure of 1 milliametre (mercury gauge) are obtained and also 90 parts of unchanged monochlorbutane, 214 parts of 1,2- and 1,3-dichlorbutane, and 100 parts of trichlorbutane, 190 parts of monochlorbutane, entrained with the escaping gases which consist mainly of hydrogen chloride, may be separated by cooling after washing out with water and then returned to the reaction chamber.

Example 2

A total of 426 parts of chlorine and 420 parts of sulphur dioxide are led during the course of 5 hours into 710 parts of cyclohexyl chloride in the manner described in Example 1. 87 per cent of the cyclohexyl chloride are thereby converted into chlorcyclohexane sulphonic acid chloride.

Example 3

120 parts of chlorine are led while irradiating with ultra-violet light into 600 parts of a hydrocarbon mixture having a boiling range of 200° to 350° C. which has been prepared by catalytic hydrogenation of carbon monoxide at atmospheric pressure. Into the resulting chlorinated hydrocarbons having an average chlorine content of 9.1 per cent there are introduced during 10 hours 120 parts of chlorine and 120 parts of sulphur dioxide in the manner described in Example 1. A product is obtained containing 14.6 per cent of chlorine and 6.3 per cent of sulphur. 7 per cent of the chlorine are combined with sulphur.

Example 4

1200 parts of 1.2-dichlor-normal-dodecane are treated within 10 hours with 400 parts of chlorine and 380 parts of sulphur dioxide in the manner described in Example 1. A product is obtained containing 32 per cent of chlorine and 9.7 per cent of sulphur; 10.7 per cent of chlorine are combined with sulphur.

Example 5

130 parts of chlorine are led in the course of some hours in 600 parts of a hydrocarbon oil having a boiling range of between 200 and 350° C. (obtained by distilling in stages a crude German petroleum and a hydrogenating aftertreatment in the presence of a heavy metal sulphide acting as catalyst) while irradiating with shortwave light. Then, 120 parts of chlorine and 120 parts of sulphur dioxide were led through the mixture of chlorinated hydrocarbons thus obtained (containing 10 per cent of average chlorine) in the course of 10 hours as described in Example 1. After working up, a product is obtained which contains 6.1 per cent of sulphur and 15.1 per cent of chlorine, 6.7 per cent of the chlorine being combined with sulphur.

What we claim is:

A mixture of sulphonic acid chlorides containing up to three sulphonic acid chloride groups combined with the radicals of a halogenated hydrocarbon mixture having a boiling range of 200° to 350° C. obtained by the catalytic hydrogenation of carbon monoxide at atmospheric pressure and by subsequently halogenating the hydrocarbon mixture produced thereby.

PAUL HEROLD.
KARL SMEYKAL.
WILHELM WOLF.
FRIEDRICH ASINGER.